United States Patent [19]

Kühnlein et al.

[11] 4,279,693
[45] Jul. 21, 1981

[54] PROCESS FOR PURIFYING POLLUTED FLUIDS

[75] Inventors: Hans Kühnlein, Füllinsdorf; Walter J. Jarosch, Bubendorf, both of Switzerland

[73] Assignee: Hch. Bertrams Aktiengesellschaft, Basel, Switzerland

[21] Appl. No.: 726,233

[22] Filed: Sep. 24, 1976

Related U.S. Application Data

[63] Continuation of Ser. No. 469,640, May 14, 1974, abandoned.

[30] Foreign Application Priority Data

May 14, 1973 [CH] Switzerland ............... 6788/73
Jan. 18, 1974 [CH] Switzerland ................ 685/74

[51] Int. Cl.³ ................................ B01D 1/02
[52] U.S. Cl. ...................... 159/47 WL; 159/16 A; 159/DIG. 32; 159/4 A
[58] Field of Search ........ 159/1 RW, 16 A, DIG. 32, 159/24 B, 4 A, 47 WL; 203/7, 26, 49

[56] References Cited

U.S. PATENT DOCUMENTS

| | | | |
|---|---|---|---|
| 1,606,390 | 11/1926 | Schmück | 432/222 |
| 2,354,175 | 7/1944 | Wilcoxson | 159/4 A |
| 2,385,955 | 10/1945 | Tomlinson | 159/47 WL |
| 2,524,753 | 10/1950 | Betts | 159/47 WL |
| 2,593,503 | 4/1952 | Tomlinson et al. | 159/4 A |
| 2,839,122 | 6/1958 | Lagurharre | 159/4 A |
| 3,153,609 | 10/1964 | Markant et al. | 159/47 WL |
| 3,299,942 | 1/1967 | Jacoby | 159/47 WL |
| 3,304,991 | 2/1967 | Greenfield | 159/1 RW |
| 3,345,272 | 10/1967 | Collins | 203/49 |
| 3,401,094 | 9/1968 | Lindsay | 203/7 |
| 3,716,458 | 2/1973 | Greenfield et al. | 159/1 RW |

Primary Examiner—Hiram Bernstein
Attorney, Agent, or Firm—Birch, Stewart, Kolasch & Birch

[57] ABSTRACT

A process for purifying a polluted fluid which comprises heating the polluted fluid and evaporating the components of said polluted fluid which are more volatile while simultaneously concentrating the pollutants into a residue, introducing said residue to a combustion chamber where it is at least partially burned and introducing the heat of combustion as the only source of heat to the evaporation stage of the process.

4 Claims, 6 Drawing Figures

PROCESS FOR PURIFYING POLLUTED FLUIDS

This application is a continuation of copending application Ser. No. 469,640, filed on May 14, 1974 and now abandoned.

Industrial fluids such as waste water, dyestuff solutions, etc., may contain impurities which can be removed biologically or chemically from the fluid only with difficulty, particularly when the purity of the waste water is to be constantly guaranteed. If the impurities are substances having a higher boiling point than that of the fluid to be purified, for example, organic fluids with a high boiling point or dissolved inorganic substances, the more voltatile components can be recovered in pure form by evaporation. If the vapor pressures of the impure components are such that a part of the same goes into the vapor phase, a subsequent distillation step can separate off the fluid which is to be obtained in pure form. However, the known evaporation and distillation processes are often not considered for the purification of fluids owing to the fact that their energy costs are too high.

In addition, as in the case of the chemical separation of impurities, in the evaporation process, sediments containing the concentrated impurities are generally left behind and these must be removed separately or destroyed. Thus, in addition to the high cost of the separation process, there is also the cost of removing the residues.

The present invention relates both to the separation of the impurities from the fluid by evaporation or distillation and to the removal of the concentrated impurities, these two processes being combined in such a way that a particularly advantageous circulation of heat is obtained, thereby reducing the energy costs.

Accordingly, the process according to the invention for purifying polluted fluids is characterized in that the aqueous component is separated off by a multistage evaporation process or evaporation involving thermocompression and the impure components are concentrated to form a residue which is still able to flow and which is subsequently burned, for example, with the aid of a supporting flame. This combustion process represents the only source of heat for the evaporation process. Any impurities which are also evaporated are advantageously separated from the aqueous component after the evaporation process and supplied in the fluid state to the components to be burned. Advantageously, the supplying of energy from the combustion process to the first evaporation stage is effected by means of an intermediate heat carrier while the subsequent evaporation stages are heated by means of the vapors from the preceding evaporation stages. As already stated, evaporation is effected exclusively with the heat from the combustion process. To safeguard the combustion process, additional fuel is advantageously burned with the concentrated residues.

The plant for effecting the process which is also an object of the present invention is characterized by a plurality of evaporators arranged in series and by a combustion furnace connected to the concentrate outlet of the last stage. This combustion furnace is connected to the first evaporator via a heat carrying line.

In the combined process for purifying effluents by evaporating the water and burning the residues, depending on the composition of the impurities, it is possible for a certain quantity of readily volatile substances to be converted with the water into the vapor phase and for them to be present during the condensing stage in the water distillate in the form of a disturbing impurity. If the evaporated water is not to be subjected once again to the same process from which it has been obtained, it is necessary for these impurities to be removed by additional precautionary measures. A particularly advantageous process according to the invention which is designed for this purpose is characterized in that oxygen and heat are supplied to the vapors produced during evaporation in such a way that the impurities carried with the vapors are converted during oxidation into non condensable gases which are separated from the remaining vapors by condensation. This oxidation step can be effected, for example, by using a catalyst having a relatively low overheating or final steam temperature.

For effecting this process, the plant according to the invention is provided with a vapor condenser which is associated with the evaporating stage and the delivery outlet of which is connected to a reaction vessel via a heating device. The reaction vessel is itself connected to a condenser for separating the condensable vapors from the non condensable vapors.

The main purpose of a purifying process of this type consists in the complete purification of polluted fluids and, more particularly, of industrial effluents, that is, the impurities are to be reduced to a state in which they will have a minimal polluting effect on the environment and the process steps are to be combined to reduce energy outlays.

Other objects, features and advantages of the present invention will be made apparent from the following detailed description thereof which is provided with reference to the accompanying schematic drawings, in which:

Figure 1:
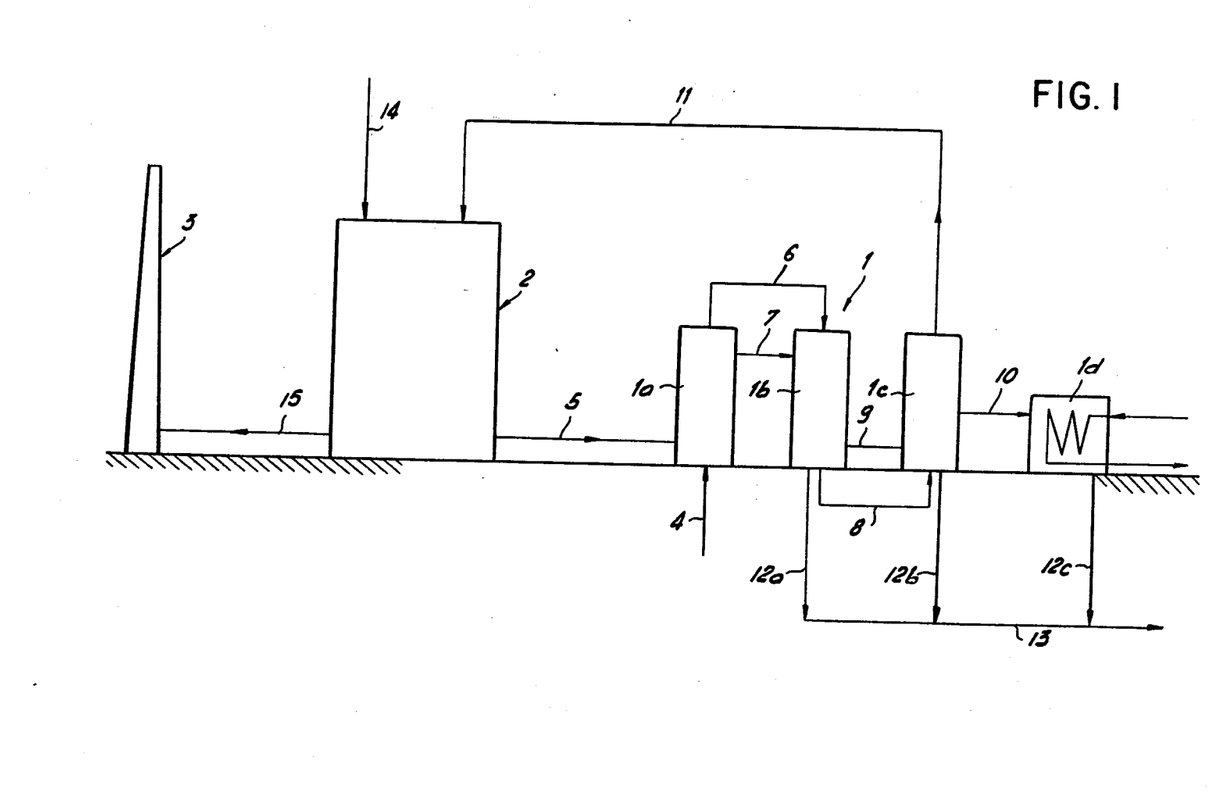
FIG. 1 is a structural diagram of an effluent purification plant according to the invention.

The principle of the plant for purifying effluents is represented in FIG. 1. 1 designates an evaporation system comprising three evaporators 1a, 1b and 1c, which are arranged in series, and an end condenser 1d. 2 represents a combustion furnace and 3 is the chimney provided for this furnace. At 4, the effluent to be purified is supplied to the first evaporating stage 1a. The effluent in question consists, for example, of an aqueous solution containing 5% impurities which are to be removed and which have a high boiling point. This evaporating stage 1a is heated by means of a heat carrier which is supplied via a line 5 coming from the combustion furnace 2. The concentrate which reaches the second stage 1b through the connecting line 6 is concentrated therein using the vapors from the first stage supplied to this second stage by the connecting line 7. An analogous process is repeated in the third evaporating stage 1c, to which the concentrate is supplied via the connecting line 8 and in which a further quantity of water is removed from this concentrate using the vapors from the second stage 1b supplied to the stage 1c via the connecting line 9. The vapors from the third stage 1c proceed to the end condenser 1d via the line 10. In the end condenser 1d, heat is removed from the vapor whereas the concentrate from 1c is supplied to the combustion furnace 2 via the line 11. The distillate produced in the evaporating stages 1b and 1c and in the end condenser 1d is discharged via corresponding lines 12a, 12b, 12c, through a collecting line 13. By way of example, the above described evaporating system may be designed in such a way that 30% purified water is separated off in each of the stages 1b and 1c and in the end condenser 1d so that the concentrate reaching the line 11 leading to the combustion device 2 contains 5% residual water in addition to the 5% impurities. This concentrate which is still able to flow is totally burned up in the combustion device 2 at a relatively high temperature (for example, about 1000° C.) with the aid of additional fuel (heating oil or gas) which is supplied via a connection 14. The flue gases leaving the combustion device 2 are cooled so that when they are discharged through the line 15 into the chimney 3, they only carry off approximately 20% of the heat produced in the combustion device 2 while the major part of this heat, that is, approximately 80% is transmitted by indirect heat exchange to the heat carrier heating the first evaporating stage via the line 5.

Figure 2:
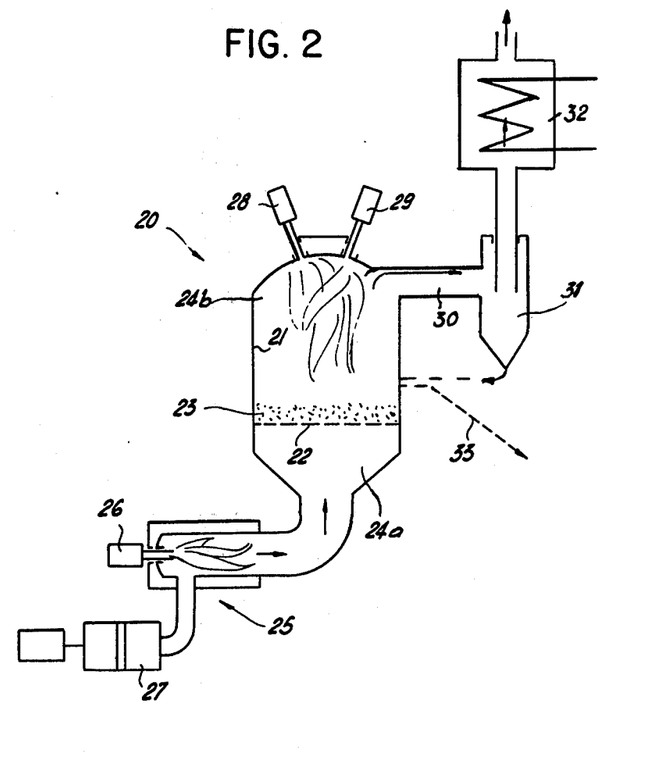
FIG. 2 is a first embodiment of a combustion furnace for the plant according to FIG. 1.

The heating system may comprise, for example, a furnace with a fluidized bed such as is represented diagrammatically in FIG. 2. In the combustion chamber 21 of the furnace 20, there is provided an intermediate bottom 22 on which a vortex layer 23 is formed. The chamber 24a located below the intermediate bottom 22 communicates with a hot gas generator 25 in which hot vortex gas is produced by a burner 26 operating with excess air and associated with blast apparatus 26. An auxiliary burner 28 which is supplied with fuel and a main burner 29 supplied with the concentrate from the evaporating system discharge into the upper part of the chamber 24b located above the vortex layer 23. The flames from the two burners 28, 29, are thus directed downwards from above, counter to the vortex layer while the gas outlet of this chamber 30 is arranged laterally in an upper portion thereof and is connected to the chimney via a cyclonic dust separator 31 and a waste heat boiler 32 for the recovery of heating energy. The waste heat boiler provides heat for the first evaporating stage in the evaporating system. The vortex layer 23 consists advantageously of a neutral sand on which the sediment particles injected by the burner 29 form sinter during the combustion process. However, this layer may itself consist of sediment particles which precipitate out as uniform crystals. During the operation of the above-described combustion system, a temperature of approximately 800°-1000° C. is produced in the vortex layer 23 by the combustion and by the supplying of hot vortex gas, so that complete oxidation of the sediment particles contained in the concentrate supplied and complete elimination or evaporation of the residual water occurs. The hot vortex gases coming from below mix in the upper chamber 24b with the combustion gases, whereupon the solid content of the exhaust gases in the cyclonic separator 30 are separated out and resupplied to the fluidized bed. An outlet 33 for solid materials is provided for the vortex layer 23 so that the excess solid particles from the vortex layer can be constantly removed.

Figure 3:
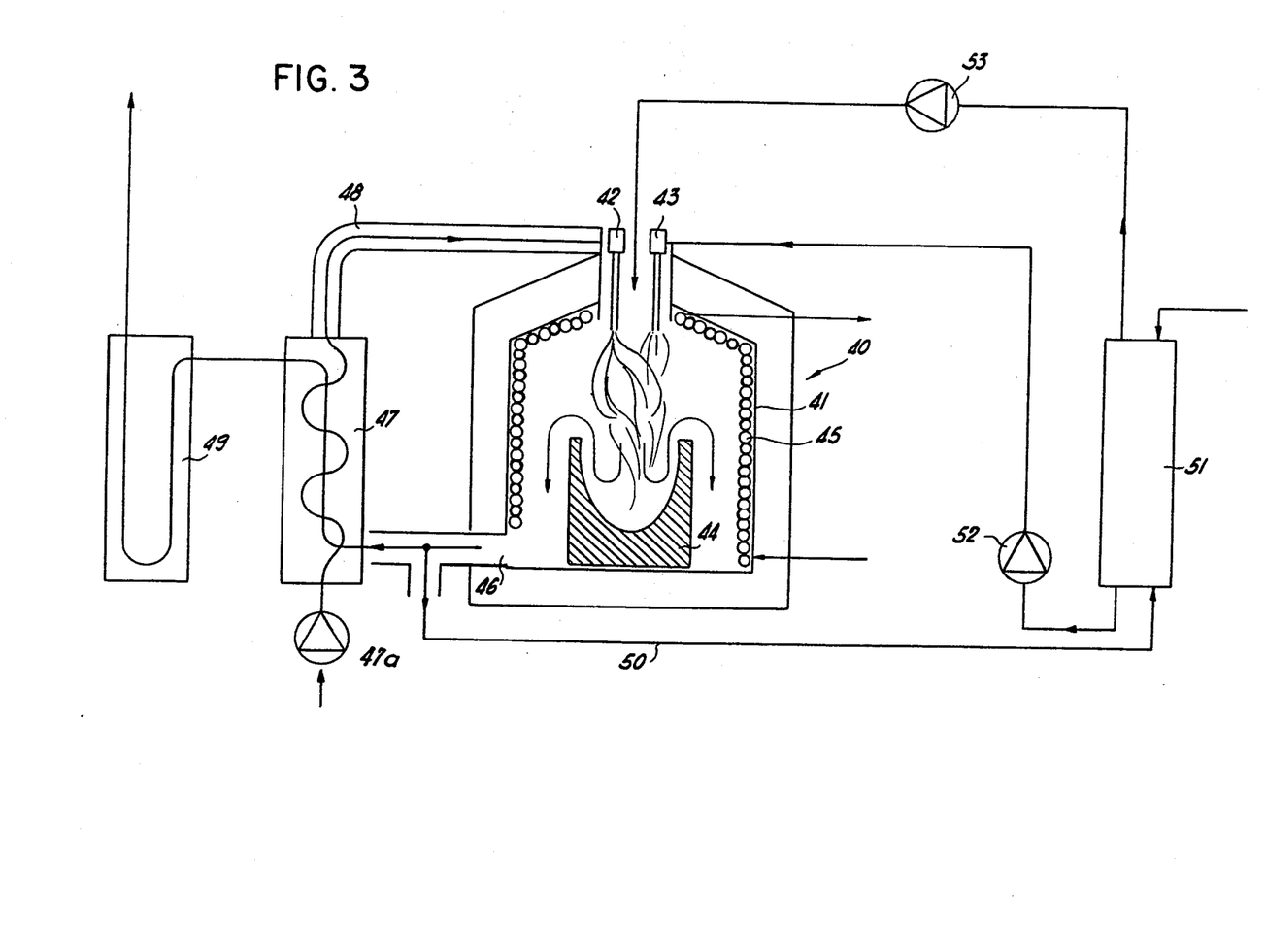
FIG. 3 shows a second embodiment of a combustion furnace for the plant according to FIG. 1.

A second embodiment of a combustion system is represented in FIG. 3. This system comprises a so-called heating zone furnace 40. An auxiliary burner 42 which is supplied as required with additional fuel and the main burner 43 which is supplied with the concentrate from the evaporating system discharge into an upper region of the inner sheathing 41 of this furnace. In addition, an upwardly open insulated cup 44 is also provided within the sheathing 41. A heat exchange surface 45 (for example, a coil of wound piping) is arranged on the inner side of the sheathing 41. This heat exchange surface 45 carries away the heat for heating the first evaporating stage. The downwardly disposed exhaust gas outlet 46 is connected to an air heater 47 supplied by means of a blast device 47a. This air heater 47 is used to preheat the combustion air supplied to the burners 42, 43, via a line 48 so that combustion takes place at a correspondingly higher temperature. The exhaust gases reach the chimney via a dust separator 49. To thicken the concentrate to be burned in the furnace to the limit of its fluidity and hence to increase its inflammability, thereby not only reducing the amount of fuel required but also providing better use of the heating energy supplied by the furnace, in the embodiment according to FIG. 3, a branch line 50 is connected to the exhaust gas outlet 46 of the furnace. Part (approximately 30%) of the exhaust gas which is still hot (for example, ca. 500° C.) is supplied through this branch line 50 to an end evaporator 51 of the evaporating system, this end evaporator 51 having no heating surfaces. The concentrate coming from the preceding evaporating stage and having a relatively low temperature, (for example, ca. 60° C.) is brought into direct contact with these exhaust gases and here loses its residual water. At the limit of its flowability, it is now supplied by means of a pump 52 to the main burner 43 while the exhaust gases, cooled, for example, to approximately 100° C., and the evaporated water are returned into the upper part of the combustion furnace 40 through a ventilator 53. In this furnace, with the "circulation" of a part of the exhaust gases at normal pressure, these act as an additional evaporating stage for using up the waste heat while avoiding any risk of incrustation.

Figure 4:
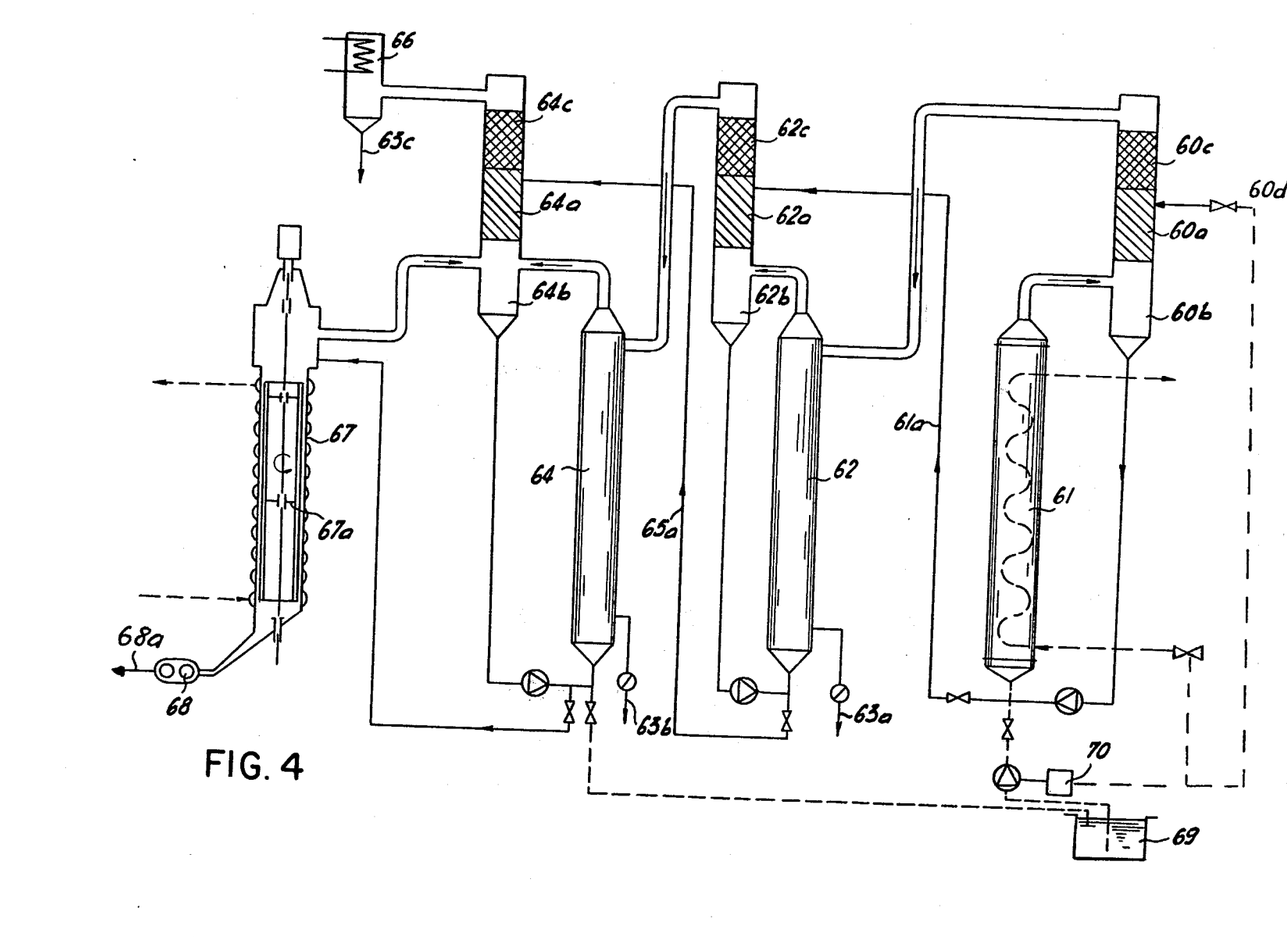
FIG. 4 is an embodiment of an evaporating system for the plant according to FIG. 1.

FIG. 4 shows an especially advantageous embodiment of the evaporating system. The system represented comprises a preheater 60a with a separator 60b and a first evaporating stage 61, a second evaporating stage 62 with a separator 62b, a third evaporating stage 64 with a separator 64b and an end container 66, and an end evaporator 67 connected in series therewith and comprising a feed pump 68 for the end concentrate which is supplied to the combustion system via the line 68a. The first evaporator 61 heated by the heat carrier from the combuston system (for example, heated to 150°-300° C.) receives the effluent to be purified via the preheater 60a. In this case, the evaporator 61 is a circulation evaporator which operates at a boiling temperature of 100°-250° C., a pressure being produced which corresponds to the vapor separated from the fluid phase in the separator 60b. The fluid phase reaches the second evaporator 62 via a line 61a and the separating column 62a while the vapors flow to the second evaporator 62 via the preheater 60a and a washing column 60c. In the preheater 60a, the effluent flowing in via the inlet 60d is heated to boiling point to separate off impurities which become less soluble as the temperature increases. The second evaporator 62 is heated by means of the vapors from the first evaporator 61. The boiling temperature in this evaporator 62 ranges, for example, from 80°–160° C. The fluid concentrate passes via the line 65a to the evaporator 64 in which evaporation takes place at a boiling temperature of, for example 40°–100° C., the vapors once again being separated from the fluid phase in the separator 64b. As, in many cases, the concentrate obtained from the evaporator 64 tends to deposit salts or substances which will settle on the heat exchange pipes, the evaporator stage 67 is connected in series therewith. This evaporator stage 67 comprises a cylindrical heat exchange surface in which a mechanically driven element 67a prevents the formation of incrustations. In the embodiment represented, this evaporator stage is heated by heat carrier heated in the combustion system. The latter two evaporator stages 64 and 67 advantageously operate with a boiling temperature at atmospheric pressure but they can also be operated with vacuum equipment at underpressure. The values of the boiling temperatures depend on the vapor pressures of the impure components and should be selected in such a way that the admissible impurities in the waste water are not exceeded. To reduce these, the vapors at the outlet of the separator are further purified by means of the separating columns 62a and 64a and the washing columns 62c and 64c.

The entire evaporating system is designed with a minimum of flow regulation so that it can operate automatically 24 hours a day without the supervision of personnel. This is a prerequisite of effluent treatment plants which, above all, should be designed to avoid additional personnel costs. If the effluent has a tendency to soil or form incrustations on the evaporator surfaces, evaporation can be stopped fully automatically by a timer system 70 and a rinsing fluid for removing incrustations and cleaning the evaporator surfaces can be introduced for a very short time into the plant from a chemical container 69 via a switch valve. The fully automatic controlling of this operation also eliminates expenditure on personnel.

Figure 5:
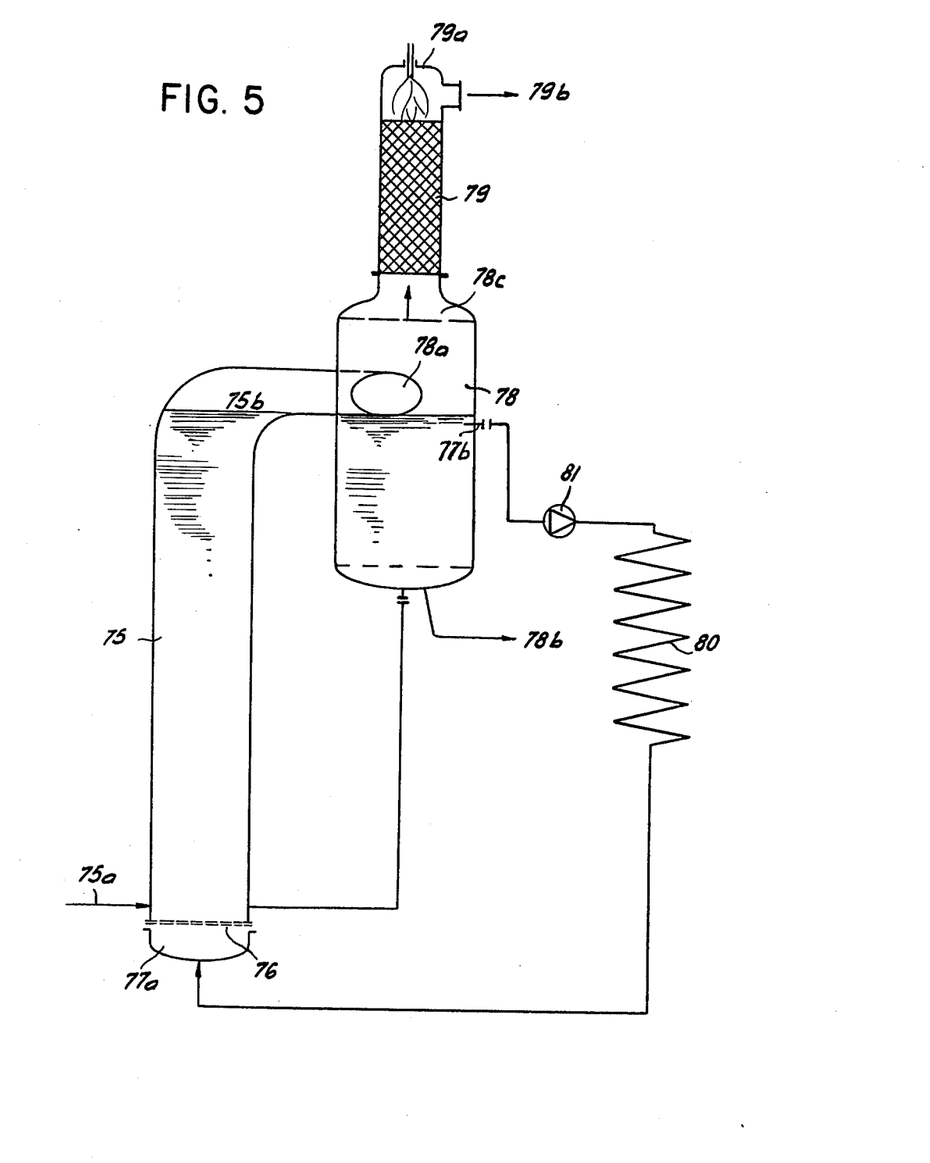
FIG. 5 is a variant of the first evaporating stage of the system according to FIG. 4.

As stated, in many cases, the liquids to be evaporated have a tendency to form incrustations on the evaporator surfaces. In these cases, it is possible to employ an evaporating principle consisting in that, instead of using heat exchange surfaces, direct heat exchange is provided, wherein the heat is supplied, for example, by means of a medium which does not mix with the medium and passes directly through the aqueous solution in the form of bubbles. The heat carrying medium itself is heated by passing it through a continuous flow heater. Minimal losses of the medium which are more or less carried along in the aqueous solution are constantly replaced. As the evaporated residues in which these parts may be found are burned anyway, this is no disadvantage. This type of evaporator stage with direct heat transmission is represented in FIG. 5. The direct heat exchange between the insoluble heat carrying medium and the liquid to be evaporated takes place in a cylindrical, vertical vessel 75. The liquid to be evaporated enters at the bottom at 75a and the vapor and liquid mixture is discharged via a lateral outlet connection 75b. The heat carrier is fed into the heat transmission zone in finely distributed form by means of an atomizer plate 76. It is discharged from the chamber 77a, gives off its heat, is separated in the separator and collected at 77b. The liquid and vapor mixture enters the separator 78 via the tangential inlet connection 78a. The concentrated fluid leaves the separator at 78b while the vapors are discharged up above at 78c and are purified in a column 79 of fluid particles which do not boil readily and of impure fluid particles. The column is sprayed with pure liquid by a spraying system 79a. The purified vapors leave the column at 79b. The heat carrier is heated in a continuous flow heater 80 and kept in circulation by a pump 81.

In the case of temperature-sensitive components in the waste water which can decompose or pass into the vapor phase at higher temperatures, falling film evaporators are advantageously used in place of pipe-type evaporators, particularly at the last stage. These are known to provide a more gentle evaporation process.

By means of the process described, it is possible to recover a component from a fluid mixture in its purest possible form by evaporation while other components in the form of residues can be concentrated in such a way that they can be burned with minimum heat consumption. The heat which may be recovered from the combustion process is used entirely to to supply the evaporation process with the necessary energy, this evaporation process comprising a number of stages and being designed in such a way that this heat is adequate. It is possible to adapt the multistage evaporating process to the media to be evaporated in such a way that the components to be evaporated are obtained in pure form and none of the components from the residues are evaporated at the same time. If the vapor pressures are such that parts of the residual components are converted to the vapor phase, these are removed in the separating columns connected in series with the evaporator in counterflow with the vapors and are returned in the fluid state while the vapors are subsequently purified in a washing column of any further impurities carried with them.

Although it has been presumed in the preceding text that the entire quantity of concentrate obtained was supplied to the combustion operation, it is possible to envisage cases where this is only effected in part. It is also possible for the evaporation process not to be carried out exclusively with energy obtained from the combustion process-even if this is the main object of the invention. In general, the impurities will be concentrated until a concentrate which is still capable of flowing is obtained. However, it is also possible to operate with a fluid, solid material concentrate (i.e., dry concentrate). It is also possible to envisage incrusted or caked end concentrate as long at these can be broken up again.

Figure 6:
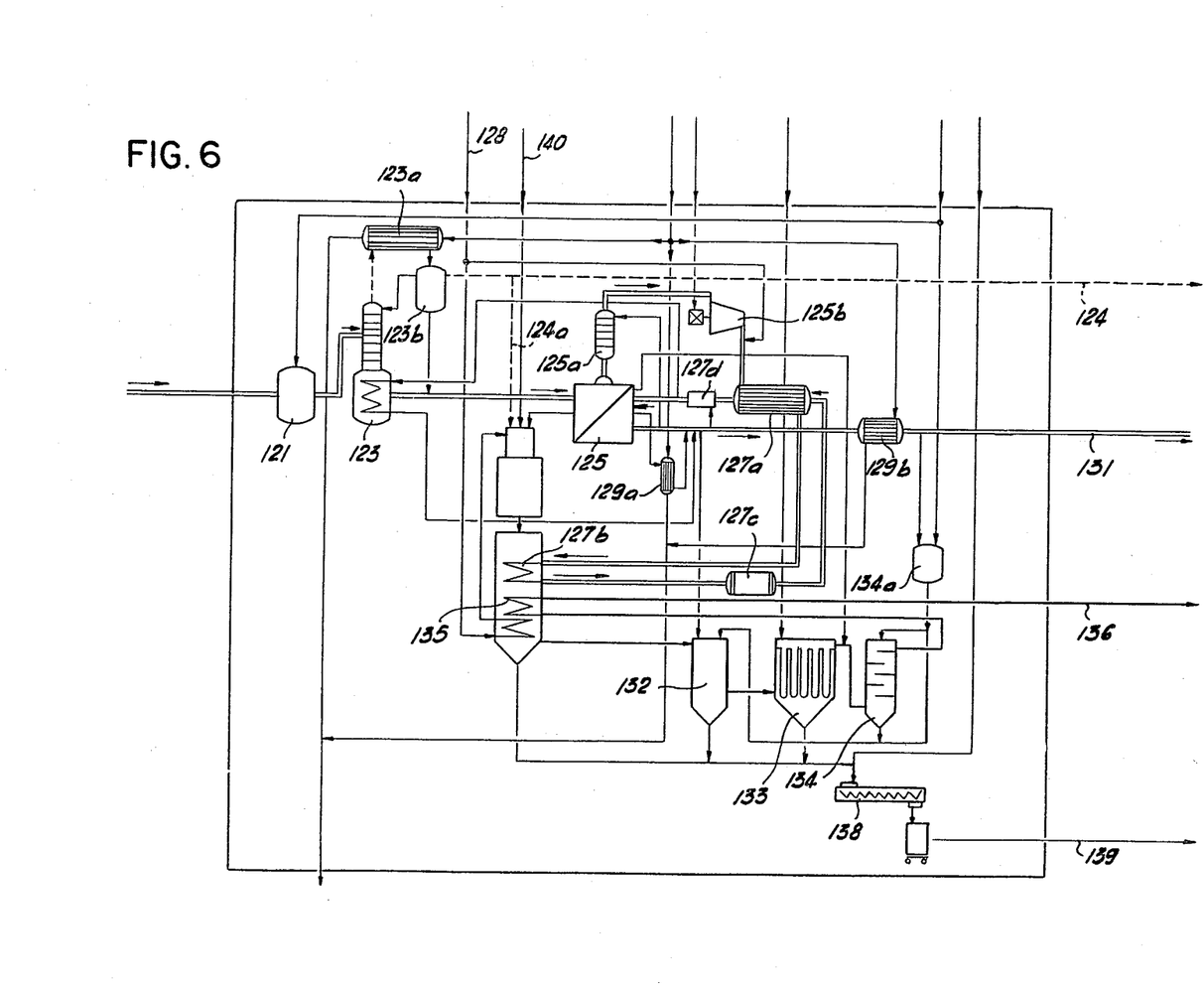
FIG. 6 is a diagrammatic view of an embodiment of a purification plant comprising thermocompression, vapor purification and gas washing stages.

In the layout diagram according to FIG. 6, the effluent supplied at 121 is neutralized by the addition of a suitable neutralization medium, for example, to a pH value of 6–8. This neutralization not only protects the system against corrosion but it also avoids subsequent reactions of impurities.

Any solvents which may be present are removed from the neutralized waste water at 123 by heating the waste water and separating off by distillation the fractions having a lower boiling point. The solvents which have been separated off in this way are discharged from the plant at 124 and may possibly be reused. Otherwise, they are supplied to the combustion process at 124a. The one or more evaporator stages are represented diagrammatically at 125. In these evaporator stages the impurities are concentrated and supplied to the combustion furnace 126 while the vapors are supplied to a purification stage 127 in which the oxidizable vapor components are burned while air is supplied at 128.

The vapors are thereafter condensed in the evaporator 125 and in the successive condenser 129, the non-condensable gases being separated off while the condensed, pure water leaves the plant at 131.

At this stage, the requirement stated initially, that is, of reducing the impurities to the extent where they have a minimal polluting effect on the environment, has not yet been achieved. To effect this, the combustion products from the furnace 126, the exhaust gases which are there produced and the non-condensable gases from the vapors which are separated out from the condenser must still be treated in a suitable manner. To this end, the exhaust gases produced during the combustion operation are subjected to a cooling operation in a cooler 132 with simultaneous evaporation of the washing water and drying of the solid substances contained therein. The exhaust gases which have been cooled in this way are filtered at 133 for the purpose of separating off the finest particles (ash) and are subjected to a gas washing operation in which the sulfur and nitrogen compounds, in particular, are removed from the exhaust gases. The exhaust gases which have been purified in this way and cooled quite considerably are then heated again at 135 to be released into the atmosphere at 136 without producing smoke.

The solid substances obtained from the stations 132, 133, 134 and 135 are supplied to an agglomerator 138 where they are rendered into a storable agglomerate by means of a suitable binding agent. It should be noted that both substances soluble in water and insoluble in water may be obtained. To fulfil the requirement expressed initially, it is therefore necessary to bind or enclose the solid substances which are soluble in water in such a way that a product which is insoluble in water is obtained. The solid substances discharged from the plant at 139 are thus insoluble in water and can be deposited with the minimum amount of pollution of the environment.

As is readily apparent from the diagram according to FIG. 6, the heat requirement of all the purification stages is covered by the combustion process at 126. This combustion process is itself largely sustained by the impurities providing the energy, that is, the need for additional fuel (which is supplied at 140) is minimal.

EXAMPLE 1

FIG. 6 also represents a concrete embodiment. This embodiment relates to the processing of a pharmaceutical effluent. As a measure of its impurities, the organic carbon content (Total Organic Content-TOC) of this effluent is 10,000 mg/kg. The capacity of the plant is 1000 kg effluent per hour. The pure vapor, which is discharged from the washing column 125a at, e.g., 50° C. and at the working pressure of the evaporation of, e.g., about 0.5 atmosphere, is subsequently condensed in the condenser 125b at atmospheric pressure. As this vapor still contains organic impurities (in practice, approximately 10% of the organic carbon content of the effluent), these are subsequently oxidized. For this purpose, air is supplied from the line 128 after the condenser step 125b. Advantageously, double the amount of air theoretically required to burn these impurities, is supplied. The air and vapor mixture is supplied at a temperature of, for example, 100°-150° C. to a heat exchanger 127a in which it is overheated (in counter-flow to the purified hot vapors), for example, to 300°-350° C. By supplying additional heat in a heat exchanger associated with the combustion furnace, the air and vapor mixture is further heated so that in the subsequent reaction vessel 127c, complete oxidation or combustion of the organic impurities takes place. If the vessel 127c contains a suitable catalyst, (for example, in granulated form), it is sufficient to heat to 400°-450° C., totally remove all the volatile, organic impurities. If a catalyst is not used, the vessel 127c advantageously contains a filler consisting of ceramic particles which ensure perfect mixing of the gas and heating temperatures of 800°-900° C. are then required. The purified vapors which leave the heat exchanger 127a with a temperature of, for example, 250° C., pass to the evaporating system via an injection cooler 127d, in which they are converted into saturated vapor (ca. 100° C.). Once in the evaporating system, they impart practically their entire heat of evaporation to the waste water being supplied.

The concentrate obtained from the evaporating system 125 is supplied to the combustion system 126 together with an auxiliary fuel from the line 140 (and possible with substances obtained from the solvent separation stage). The hot (ca. 300° C.) exhaust gases there produced first pass into the cooler 132 in which they are cooled to, for example, ca. 150° C. They then pass through a dust filter 133 and thereafter a gas washer 134 before they are reheated in the heat exchanger 135, for example, to ca. 150° C. They are then discharged into the atmosphere at 136.

The non-condensable gases, more particularly, nitrogen and sulfur compounds, obtained from the thermal vapor treatment stage are mixed with the exhaust gases before they are supplied to the gas washer 134 and in the gas washer they are separated out. To keep the water flow as small as possible, the washing water is circulated and replenished to the saturation limit.

The impurities from the effluent which are reduced to dry solid substances are subsequently processed to form water-resistant agglomerates which are easy to handle or to transport and deposit.

Thus this plant not only enables the water to be purified practically completely, but the flue gases produced contain not only considerably less nitrogen and sulfur oxides than in the case of conventional industrial furnaces, but they are also free of CO and HCl and the solid materials thereby produced are insoluble in water and can be stored as such. Thus the atmospheric pollution of a plant of this nature is minimal.

It is obvious that other impure liquids can be purified in the manner described.

EXAMPLE 2

Such a fluid is, for example, a waste lubricant emulsion from the machine industry. It is polluted with a lubricating oil, an emulsifier, a solvent and dirt particles.

From 1000 kg of this solution, it is possible to evaporate out 940 kg water. The impurities which remain amount to 60 kg and these can be easily burned with an added quantity of 20 kg of heating oil. The vapors which are evaporated out have a TOC content of 2000 mg. per liter. The vapors are heated to 900° C. while 25-30% by weight air is supplied. The impurities are totally burned in the combustion zone. The vapors and the combustion gases are discharged from this zone at a temperature of 920° C. The cooled and condensed vapors still have a TOC content of 2-6 mg. per liter.

What is claimed is:

1. A continuous process for purifying an impure effluent comprising a volatile component and a non-volatile component, said process including the steps of:

(1) heating the effluent to evaporation to produce an impure vapor containing the volatile component and a residue comprising a concentrate of the non-volatile component;

(2) introducing the residue into a combustion chamber, where it is at least partially burned;

(3) using the heat of combustion obtained in the combustion chamber to indirectly supply heat for use in evaporation step (1);

(4) adding air to the impure vapor containing the volatile component to produce an impure vapor/air mixture;

(5) indirectly heating the impure vapor/air mixture;

(6) introducing the heated impure vapor/air mixture into a reaction chamber where complete oxidation and combustion of the remaining impurities takes place to produce a purified vapor containing non-condensable gases; and (7) using the purified vapor containing the non-condensable gases to indirectly heat the impure vapor/air mixture in step (5).

2. The process of claim 1, wherein the purified vapor after indirectly heating the impure vapor/air mixture, transfers its remaining heat to the evaporation stages of the process.

3. The process of claim 2, wherein the purified vapor, after having indirectly heated the impure vapor/air mixture is injected with clean water to convert the purified vapor into saturated vapor and is then passed to the evaporation stages of the process.

4. The process of claim 3, wherein the purified vapor containing non-condensable gases recovered from the evaporation stages are mixed with the exhaust gases produced by burning the residue and then washed out of this gas, said washed exhaust gases being discharged into the atmosphere.

* * * * *